(12) United States Patent
Kumor

(10) Patent No.: US 8,923,929 B2
(45) Date of Patent: Dec. 30, 2014

(54) METHOD AND APPARATUS FOR ALLOWING ANY ORIENTATION ANSWERING OF A CALL ON A MOBILE ENDPOINT DEVICE

(71) Applicant: Xerox Corporation, Norwalk, CT (US)

(72) Inventor: Damian Kumor, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 59 days.

(21) Appl. No.: 13/757,501

(22) Filed: Feb. 1, 2013

(65) Prior Publication Data
US 2014/0221048 A1    Aug. 7, 2014

(51) Int. Cl.
*H04M 1/00* (2006.01)
*H04W 68/00* (2009.01)

(52) U.S. Cl.
CPC .................................. *H04W 68/005* (2013.01)
USPC ................ 455/569.1; 455/575.1; 379/433.02; 379/433.03

(58) Field of Classification Search
CPC ................................ H04W 4/04; H04W 48/04
USPC ................ 455/418, 569.1, 575.1; 379/433.02
See application file for complete search history.

(56) References Cited

U.S. PATENT DOCUMENTS

| | | | |
|---|---|---|---|
| 6,819,946 B2 * | 11/2004 | Hansson | 455/569.1 |
| 8,243,961 B1 * | 8/2012 | Morrill | 381/123 |
| 2012/0231778 A1 * | 9/2012 | Chen et al. | 455/418 |

* cited by examiner

*Primary Examiner* — Christopher M Brandt
*Assistant Examiner* — Joseph Dean, Jr.

(57) ABSTRACT

A method, non-transitory computer readable medium, and apparatus for processing a call on a mobile endpoint device in any orientation are disclosed. For example, the method receives an incoming call, detects a call answering signal, detects an audio signal within a time period after the call answering signal, determines an orientation of the mobile endpoint device and activates a microphone from a first speaker and microphone pair and a speaker from a second speaker and microphone pair based upon the orientation of the mobile endpoint device.

9 Claims, 4 Drawing Sheets

METHOD AND APPARATUS FOR ALLOWING ANY ORIENTATION ANSWERING OF A CALL ON A MOBILE ENDPOINT DEVICE

The present disclosure relates generally to mobile endpoint devices and, more particularly, to a method and an apparatus for allowing any orientation answering of a call on a mobile endpoint device.

BACKGROUND

Current mobile endpoint devices are typically rectangular in shape and allow for orientation in two limited directions, e.g., portrait or landscape. As a result, a user is limited to having to orient the mobile endpoint device into one these two limiting options when viewing the display.

In addition, currently when a user receives an incoming call on his or her mobile endpoint device, the user can only answer the call in one direction or orientation if they put the mobile endpoint device to his or her ear (as opposed to using a speaker phone mode or a hands free kit). As a result, the user is always required to first look at his or her mobile endpoint device, rotate the mobile endpoint device until it is in the proper orientation and then answer the incoming call.

SUMMARY

According to aspects illustrated herein, there are provided a method, a non-transitory computer readable medium, and an apparatus for processing a call on a mobile endpoint device in any orientation. One disclosed feature of the embodiments is a method that receives an incoming call, detects a call answering signal, detects an audio signal within a time period after the call answering signal, determines an orientation of the mobile endpoint device and activates a microphone from a first speaker and microphone pair and a speaker from a second speaker and microphone pair based upon the orientation of the mobile endpoint device.

Another disclosed feature of the embodiments is a non-transitory computer-readable medium having stored thereon a plurality of instructions, the plurality of instructions including instructions which, when executed by a processor, cause the processor to perform a method that receives an incoming call, detects a call answering signal, detects an audio signal within a time period after the call answering signal, determines an orientation of the mobile endpoint device and activates a microphone from a first speaker and microphone pair and a speaker from a second speaker and microphone pair based upon the orientation of the mobile endpoint device.

Another disclosed feature of the embodiments is an apparatus comprising a processor, a call answer button in communication with the processor, an accelerometer in communication with the processor and a plurality of speaker and microphone pairs, wherein a speaker and a microphone of each one of the plurality of speaker and microphone pairs are located opposite from another speaker and another microphone of another one of the plurality of speaker and microphone pairs.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and new mobile endpoint device for answering an incoming call on a mobile endpoint device in any orientation. As discussed above, currently when a user receives an incoming call on his or her mobile endpoint device, the user can only answer the call in one direction or orientation if the user places the mobile endpoint device to his or her ear. As a result, the user is always required to first look at his or her mobile endpoint device, rotate the mobile endpoint device until it is in the proper orientation and then answer the incoming call.

One embodiment of the present disclosure provides a mobile endpoint device and method for answering an incoming call (or alternatively dialing or initiating a call) on a mobile endpoint device in any orientation. As a result, a user may answer an incoming telephone call on his or her mobile phone in any orientation without having to determine, e.g., to look, at his or her mobile phone first to orient the mobile phone properly before answering the incoming call.

Figure 1:
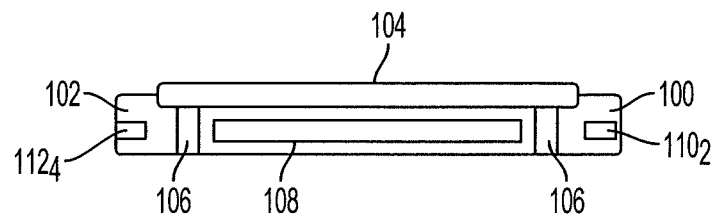
FIG. 1 illustrates a side view of one embodiment of a mobile endpoint device providing call answering in any orientation.

To better understand the present disclosure, FIG. 1 illustrates an example of a mobile endpoint device 100. In one embodiment, the mobile endpoint device 100 may be a cellular telephone or a smart phone. In one embodiment, the mobile endpoint device 100 may be a polygon shape for example a triangle, a square, a rectangle, a hexagon, an octagon, and the like.

In one embodiment, the mobile endpoint device 100 includes a casing or a housing 102, a display 104 and a circuit board 108. In one embodiment, the display 104 may be coupled to the casing 102 and the circuit board 108 via a spring/button mechanism 106. For example, the entire display 104 may serve as a display and a button (e.g., a home button, a call answer button, and the like). A user may press his or her hand or face against the display 104 to activate a call or get to a home screen without having to search for a specific button. In one embodiment, the display 104 may be a touch screen display. In one embodiment, the mobile endpoint device 100 may have a lock button to ensure that no commands are accidentally activated by pressing the display 104 while the mobile endpoint device 100 is stored.

Figure 2:
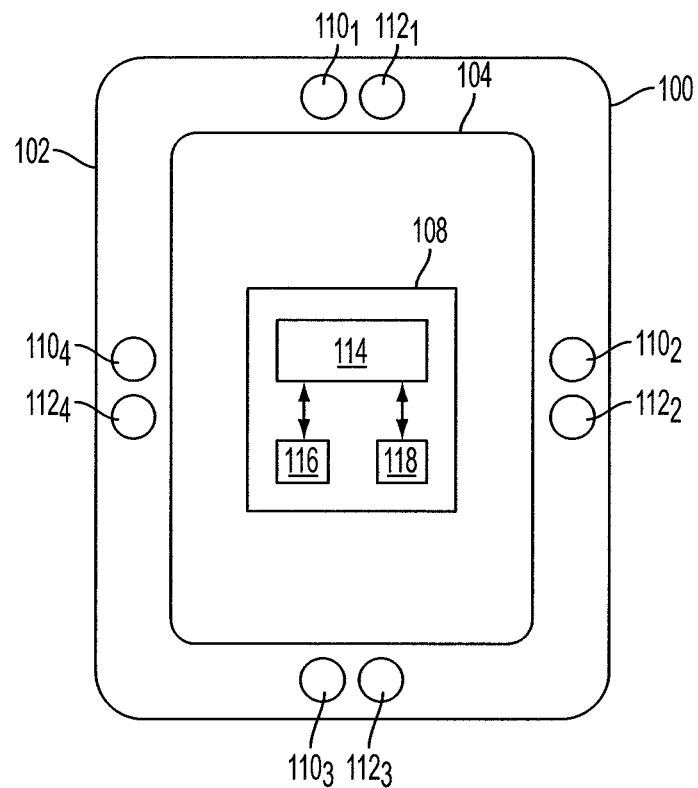
FIG. 2 illustrates a top view of one embodiment of the mobile endpoint device providing call answering in any orientation.

FIG. 2 illustrates one embodiment of a top view of the mobile endpoint device 100. FIG. 2 illustrates the circuit board 108 including additional components. In one embodiment, the circuit board 108 may include a processor 114 that is in communication with an accelerometer 116 and a memory 118. The accelerometer 116 may be used to detect various movements (e.g., direction of the movement, magnitude of the movement, acceleration of the movement, speed of the movement, etc.) of the mobile endpoint device 100.

In one embodiment, the mobile endpoint device 100 includes a plurality of speakers $110_1$-$110_4$ (also referred to collectively as speakers 110) and a plurality of microphones $112_1$-$112_4$ (also referred to collectively as microphones 112). In one embodiment, each speaker 110 may be paired with a microphone 112 to provide a plurality of speaker 110 and microphone 112 pairs. In one embodiment, the mobile endpoint device 100 may include at least two speaker 110 and microphone 112 pairs. For example, if the mobile endpoint device 100 is a rectangle and has two natural orientations for answering an incoming call, then a speaker 110 and microphone 112 pair may be located on opposing sides (e.g., a top and a bottom or a left side and a right side). It should be noted that the notion of a plurality of speaker 110 and microphone 112 pairs is simply to provide a mechanism for understanding the present disclosure. It should be broadly understood that the present disclosure provides a plurality of speakers 110 and a plurality of microphones 112, irrespective of whether they are arranged in pairs.

However, the mobile endpoint device 100 may be a symmetric shape, such as a square, for example, where the mobile endpoint device 100 may be operated in any orientation. Said another way, any 90 degree rotation of a square mobile endpoint device 100 may be a correct orientation. As a result, the mobile endpoint device 100 may have a speaker 110 and microphone 112 pair on each side of the mobile endpoint device 100. Similarly, if a design of the mobile endpoint device 100 has a greater number of sides, the mobile endpoint device 100 may have a speaker 110 and microphone 112 pair on each side or edge of the mobile endpoint device 100 corresponding to the number of sides. In one embodiment, each speaker 110 and microphone 112 pair may have one or more speakers 110. In one embodiment, each speaker 110 and microphone 112 pair may have an identical number of speakers 110 and microphones 112 or a different number of speakers 110 and microphones 112.

In one embodiment, the plurality of speaker 110 and microphone 112 pairs allows the mobile endpoint device 100 to answer an incoming call in any orientation without requiring a user to look at the mobile endpoint device 100. In one embodiment, the orientation may be determined based upon a microphone 112 that detects the audio signal with the highest decibel level.

For example, the mobile endpoint device 100 may ring indicating an incoming telephone call. A user may retrieve his or her mobile endpoint device 100 and bring the mobile endpoint device 100 to his or her face without looking at the mobile endpoint device. When the incoming call is connected, the user may start speaking. The decibel level of the audio signal detected by each one of the microphones 112 may be compared by the processor 114. The processor 114 may determine that the microphone 112 that receives the highest decibel level of the audio signal (e.g., the user's voice) is the "bottom" or side closest to the user's mouth. In one embodiment, if multiple microphones receive the audio signal at the highest decibel level, one of the microphones may be arbitrarily selected and activated. In one embodiment, the audio signal may be required to be above a predefined decibel level to ensure that false positives are removed that can be caused by ambient noise.

In one example, the microphone $112_4$ may be selected and activated as the microphone 112 receiving the highest decibel level of the audio signal. Accordingly, the processor 114 may activate the speaker 110 that is generally opposite the selected microphone $112_4$ (e.g., speaker $110_2$), which is closest to the user's ears. The processor 114 may then disable or deactivate all remaining speakers (e.g., speakers $110_1$, $110_3$ and $110_4$) and all remaining microphones (e.g., microphones $112_1$, $112_2$ and $112_3$). It should be noted that the selection of microphone $112_4$ and the speaker $110_2$ are only one example. For example, if the user were to answer the mobile endpoint device 100 rotated 90 degrees to the right, the microphone $112_3$ would be activated and the speaker $110_1$ would be activated.

In one embodiment, the combination of the display 104 and/or the accelerometer 116 may be used to determine if an incoming call is being answered. For example, if an incoming call is received (or an outgoing is initiated), a user may simply press the display 104 with his or her face without looking at the mobile endpoint device 100 to generate a call answering signal (or a call initiating signal) and begin speaking to generate an audio signal. In one embodiment, if the audio signal is detected within a predetermined time period (e.g., within 5 seconds) after the call answering signal is detected, then the mobile endpoint device 100 may determine that the call is being answered.

In another embodiment, if an incoming call is received, the accelerometer 116 may determine based upon a speed and a direction of movement of the mobile endpoint device 100 above a predefined threshold (e.g., 1 meter per second and moving upwards) that the user is raising the mobile endpoint device 100 to his or her face to generate a call answering signal. If an audio signal is detected within a predefined time period after the call answering signal, the mobile endpoint device 100 may determine that the call is being answered.

In one embodiment, the mobile endpoint device 100 may require that the accelerometer 116 detects movement and the display 104 is depressed to generate a call answering signal and that an audio signal is detected within a predetermined time period after the call answering signal. For example, if a user decides to answer the incoming call using speaker phone, the mobile endpoint device 100 may remain stationary. Consequently, only the display 104 would be depressed to generate a call answering signal and an audio signal would be detected after the call answering signal. The mobile endpoint device 100 may determine that the user is answering the call using speaker phone or a hands free set and automatically activate any speaker 110 and any microphone 112 from the plurality of the speaker 110 and microphone 112 pairs.

In one embodiment, once the mobile endpoint device 100 determines the incoming call is being answered the mobile endpoint device 100 may determine an orientation of the mobile endpoint device 100 as discussed above. As a result, a user may answer the mobile endpoint device 100 in any orientation without having to look at the mobile endpoint device 100.

Figure 3:
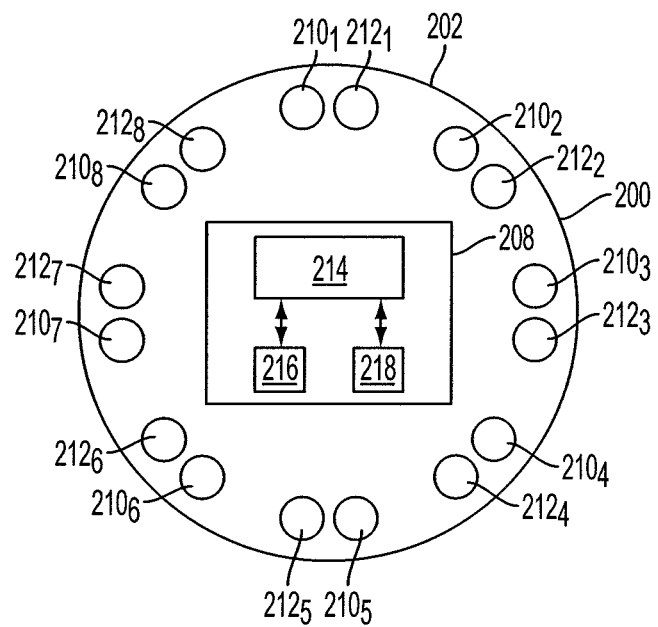
FIG. 3 illustrates a top view of a second embodiment of a mobile endpoint device providing call answering in any orientation.

FIG. 3 illustrates a top view of a second embodiment of a mobile endpoint device 200. In one embodiment, the mobile endpoint device 200 may be a cellular telephone or a smart phone. In one embodiment, the mobile endpoint device 200 may be in a round or a circular shape.

In one embodiment, the mobile endpoint device 200 may include a circuit board 208. The circuit board 208 may include a processor 214 that is in communication with an accelerometer 216 and a memory 218. The accelerometer 216 may be used to detect various movements (e.g., direction of the movement, magnitude of the movement, acceleration of the movement, speed of the movement, etc.) of the mobile endpoint device 200.

In one embodiment, the mobile endpoint device 200 includes a plurality of speakers $210_1$-$210_8$ (also referred to collectively as speakers 210) and a plurality of microphones $212_1$-$212_8$ (also referred to collectively as microphones 212). In one embodiment, each speaker 210 may be paired with a microphone 212 to provide a plurality of speaker 210 and microphone 212 pairs. In one embodiment, the mobile endpoint device 200 may include at least two speaker 210 and microphone 212 pairs.

In one embodiment, the mobile endpoint device 200 may have a plurality of speaker 210 and microphone 212 pairs located around a perimeter, around an edge, or along a side of the mobile endpoint device 200. In one embodiment, there may be an even number of speaker 210 and microphone 212 pairs, wherein each speaker 210 and microphone 212 pair is located opposite another speaker 210 and microphone 212 pair. In another embodiment, there may be an odd number of speaker 210 and microphone 212 pairs. As a result, the mobile endpoint device 200 may be answered in any orientation at any angle around a 360 degree rotational range.

Figure 4:
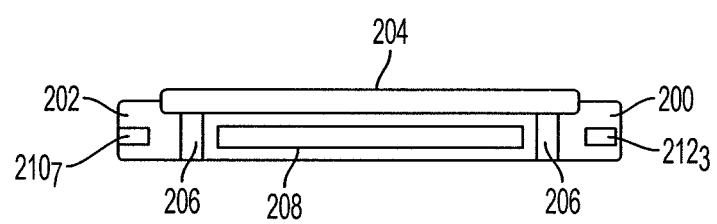
FIG. 4 illustrates a side view of the second embodiment of the mobile endpoint device providing call answering in any orientation.

FIG. 4 illustrates a side view of the mobile endpoint device 200. The mobile endpoint device 200 may include a casing or a housing 202 and a display 204. In one embodiment, the display 204 may be coupled to the casing 202 and the circuit board 208 via a spring/button mechanism 206. For example, the entire display 204 may serve as a display and a button (e.g., a home button, a call answer button, and the like). A user may press his or her hand or face against the display 204 to activate a call or get to a home screen without having to search for a specific button. In one embodiment, the display 204 may be a touch screen display. In one embodiment, the mobile endpoint device 200 may have a lock button to ensure that no commands are accidentally activated by pressing the display 204 while the mobile endpoint device 200 is stored.

In one embodiment, the orientation of the mobile endpoint device 200 may be determined similar to how the orientation of the mobile endpoint device 100 is determined. The orientation may be determined based upon a microphone 212 that detects the audio signal with the highest decibel level.

For example, the mobile endpoint device 200 may ring indicating an incoming telephone call. A user may retrieve his or her mobile endpoint device 200 and bring the mobile endpoint device 200 to his or her face without looking at the mobile endpoint device. When the incoming call is connected, the user may start speaking. The decibel level of the audio signal detected by each one of the microphones 212 may be compared by the processor 214. The processor 214 may determine that the microphone 212 that receives the highest decibel level of the audio signal (e.g., the user's voice) is the "bottom" or side closest to the user's mouth. In one embodiment, if multiple microphones receive the audio signal at the highest decibel level, one of the microphones may be arbitrarily selected and activated. In one embodiment, the audio signal may be required to be above a predefined decibel level to ensure that false positives are removed that can be caused by ambient noise.

In one example, the microphone $212_4$ may be selected and activated as the microphone 212 receiving the highest decibel level of the audio signal. Accordingly, the processor 214 may activate the speaker 210 that is opposite the selected microphone $212_4$ (e.g., speaker $210_8$), which is closest to the user's ears. The processor 214 may then disable or deactivate all remaining speakers (e.g., speakers $210_1$, $210_2$, $210_3$, $210_4$, $210_5$, $210_6$ and $210_7$) and all remaining microphones (e.g., microphones $212_1$, $212_2$, $212_3$, $212_5$, $212_6$, $212_7$ and $212_8$). It should be noted that the selection of microphone $212_4$ and the speaker $210_8$ are only one example. For example, if the user were to answer the mobile endpoint device 200 rotated slightly to the right, the microphone $212_3$ could be activated and the speaker $210_7$ could be activated.

Similar to the mobile endpoint device 100, the combination of the display 204 and/or the accelerometer 216 may be used to determine if an incoming call is being answered. For example, if an incoming call is received, a user may simply press the display 204 with his or her face without looking at the mobile endpoint device 200 to generate a call answering signal and begin speaking to generate an audio signal. In one embodiment, if the audio signal is detected within a predetermined time period (e.g., within 5 seconds) after the call answering signal is detected, then the mobile endpoint device 200 may determine that the call is being answered.

In another embodiment, if an incoming call is received, the accelerometer 216 may determine based upon a speed and movement of the mobile endpoint device 200 above a predefined threshold (e.g., 1 meter per second and moving upwards) that the user is raising the mobile endpoint device 200 to his or her face to generate a call answering signal. If an audio signal is detected within a predefined time period after the call answering signal, the mobile endpoint device 200 may determine that the call is being answered.

In one embodiment, the mobile endpoint device 200 may require that the accelerometer 216 detects movement and the display 204 is depressed to generate call answering signal and that an audio signal is detected within a predetermined time period after the call answering signal. For example, if a user decides to answer the incoming call using speaker phone, the mobile endpoint device 200 may remain stationary. Consequently, only the display 204 would be depressed to generate a call answering signal and an audio signal would be detected after the call answering signal. The mobile endpoint device 200 may determine that the user is answering the call using speaker phone or a hands free set and automatically activate any speaker 210 and microphone 212 from the plurality of speaker 210 and microphone 212 pairs.

In one embodiment, once the mobile endpoint device 200 determines the incoming call is being answered, the mobile endpoint device 200 may determine an orientation of the mobile endpoint device 200 as discussed above. As a result, a user may answer the mobile endpoint device 200 in any orientation without having to look at the mobile endpoint device 200.

Figure 5:
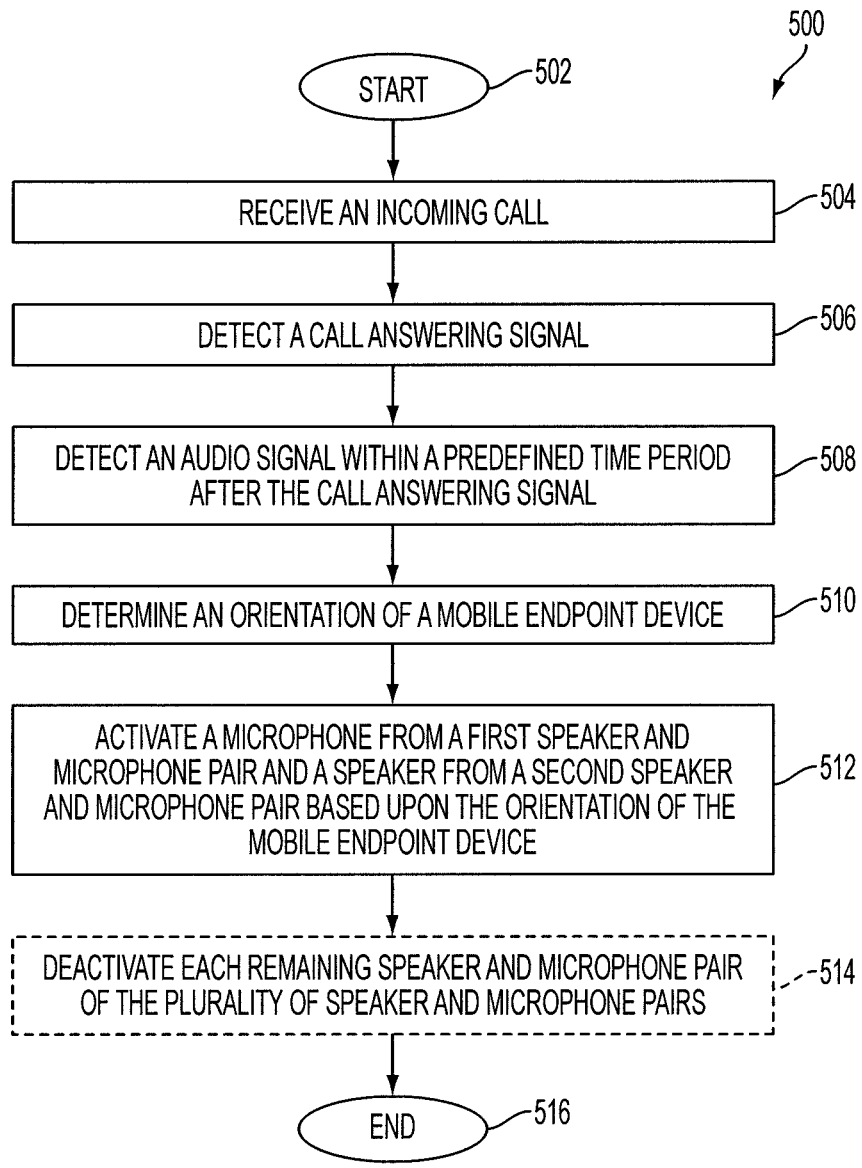
FIG. 5 illustrates an example flowchart of one embodiment of a method for answering an incoming call on a mobile endpoint device in any orientation.
Figure 6:
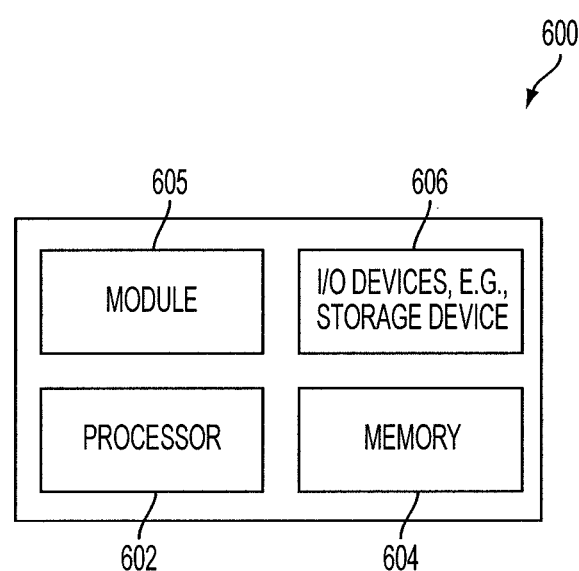
FIG. 6 illustrates a high-level block diagram of a general-purpose computer suitable for use in performing the functions described herein.

FIG. 5 illustrates a flowchart of a method 500 for answering an incoming call on a mobile endpoint device in any orientation. In one embodiment, the method 500 may be performed by the processor 114 of the mobile endpoint device 100, the processor 214 of the mobile endpoint device 200 or a general-purpose computer as illustrated in FIG. 6 and discussed below.

The method 500 begins at step 502. At step 504, the method 500 may receive an incoming call. For example, the mobile endpoint device may begin to ring or vibrate.

At step 506, the method 500 detects a call answering signal. For example, the call answering signal may be generated by pressing the screen of the mobile endpoint device, detecting a speed and movement of the mobile endpoint device above a predetermined threshold by an accelerometer in the mobile endpoint device or a combination of both.

At step 508, the method 500 detects an audio signal within a predefined time period after the call answering signal. For example, if a microphone of the mobile endpoint device detects an audio signal within 5 seconds of detecting the call answering signal, the mobile device may determine that the incoming call should be answered or connected. In one embodiment, the mobile endpoint device may require that the audio signal be above a predetermined decibel level to ensure that false positives are removed that can be caused by ambient noise.

At step 510, the method 500 determines an orientation of a mobile endpoint device. For example, once the incoming call is answered or connected, the orientation may be determined based upon a microphone that detects the audio signal with the highest decibel level.

For example, when the incoming call is connected, the user may start speaking. The decibel level of the audio signal detected by each one of the microphones may be compared. The microphone that receives the highest decibel level of the audio signal (e.g., the user's voice) may be determined to be the "bottom" or side closest to the user's mouth. Subsequently, a speaker that is opposite the selected microphone, and presumably closest to the user's ear, may be activated.

At step 512, the method 500 activates a microphone from a first speaker and microphone pair and a speaker from a second speaker and microphone pair based upon the orientation of the mobile endpoint device. For example, the microphone that detected the highest decibel level of the audio signal may be activated. In one embodiment, if multiple microphones receive the audio signal at the highest decibel level, one of the microphones may be arbitrarily selected and activated. In addition, a speaker from a second speaker and microphone pair may be activated. In one embodiment, the second speaker and microphone pair may be located opposite of the first speaker and microphone pair.

The method 500 may then perform optional step 514. At optional step 514, the method 500 may deactivate each remaining speaker and each remaining microphone. In one embodiment, this may improve the audio quality of telephone call by eliminating potential interference caused by multiple active microphones and speakers. The method ends at step 516.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

FIG. 6 depicts a high-level block diagram of a general-purpose computer suitable for use in performing the functions described herein. As depicted in FIG. 6, the system 600 comprises a processor element 602 (e.g., a microprocessor, a central processing unit (CPU) and the like), a memory 604, e.g., random access memory (RAM) and/or read only memory (ROM), a module 605 for answering an incoming call on a mobile endpoint device in any orientation, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 605 for answering an incoming call on a mobile endpoint device in any orientation can be loaded into memory 604 and executed by processor 602 to implement the functions as discussed above. As such, the present method 605 for answering an incoming call on a mobile endpoint device in any orientation (including associated data structures) of the present disclosure can be stored on a non-transitory (e.g., physical and tangible) computer readable storage medium, e.g., RAM memory, magnetic or optical drive or diskette and the like. For example, the hardware processor 602 can be programmed or configured with instructions (e.g., computer readable instructions) to perform the steps, functions, or operations of method 500.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for processing a call on a mobile endpoint device, comprising:
   receiving, by a processor of the mobile endpoint device, an incoming call;
   detecting, by the processor, a call answering signal, wherein the call answering signal is generated based upon detecting a direction of movement and a speed of the mobile endpoint device by an accelerometer above a threshold;
   detecting, by the processor, an audio signal within a time period after the call answering signal;
   determining, by the processor, an orientation of the mobile endpoint device, wherein the orientation is determined based upon comparing a decibel level received by each one of a plurality of speaker and microphone pairs of the mobile endpoint device located on each side of a polygon shape and determining a microphone of a speaker and microphone pair of the plurality of speaker and microphone pairs receiving the audio signal with a highest decibel level, wherein the microphone receiving the audio signal with the highest decibel level is considered to be a bottom side that is closest to a mouth of a user; and
   activating, by the processor, the microphone from a the speaker and microphone pair and a speaker from a second speaker and microphone pair based upon the orientation of the mobile endpoint device.

2. The method of claim 1, wherein the call answering signal is generated by a call answer button.

3. The method of claim 1, wherein the call answer button comprises a display of the mobile endpoint device.

4. The method of claim 1, wherein the audio signal is greater than the decibel level.

5. The method of claim 1, wherein the speaker and microphone pair and the second speaker and microphone pair are located opposite from one another.

6. The method of claim 1, further comprising:
   deactivating, by the processor, each remaining speaker and each remaining microphone.

7. A non-transitory computer-readable medium storing a plurality of instructions, which when executed by a processor, cause the processor to perform operations for processing a call on a mobile endpoint device, the operations comprising:
   receiving an incoming call;
   detecting a call answering signal, wherein the call answering signal is generated based upon detecting a direction of movement and a speed of the mobile endpoint device by an accelerometer above a threshold;

detecting an audio signal within a time period after the call answering signal;

determining an orientation of the mobile endpoint device, wherein the orientation is determined based upon comparing a decibel level received by each one of a plurality of speaker and microphone pairs of the mobile endpoint device located on each side of a polygon shape and determining a microphone of a speaker and microphone pair of the plurality of speaker and microphone pairs receiving the audio signal with a highest decibel level, wherein the microphone receiving the audio signal with the highest decibel level is considered to be a bottom side that is closest to a mouth of a user; and activating the microphone from a the speaker and microphone pair and a speaker from a second speaker and microphone pair based upon the orientation of the mobile endpoint device.

8. The non-transitory computer-readable medium of claim 7, wherein the audio signal is greater than the decibel level.

9. The non-transitory computer-readable medium of claim 7, further comprising:

deactivating each remaining speaker and each remaining microphone.

\* \* \* \* \*